(12) United States Patent
Jacobsthal et al.

(10) Patent No.: US 10,544,761 B2
(45) Date of Patent: Jan. 28, 2020

(54) EXHAUST STACK IN AIR INTAKE HOUSING

(71) Applicant: CNH Industrial America LLC, New Holland, PA (US)

(72) Inventors: Eric Michael Jacobsthal, Elmhurst, IL (US); Frank Zsigmond Asztalos, Orchard Lake, MI (US); David Melvin Wilkie, Turin (IT); Dwayne St. George Jackson, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 504 days.

(21) Appl. No.: 15/179,362

(22) Filed: Jun. 10, 2016

(65) Prior Publication Data

US 2017/0356406 A1    Dec. 14, 2017

(51) Int. Cl.
| | |
|---|---|
| *F02M 35/10* | (2006.01) |
| *F01N 13/08* | (2010.01) |
| *B60K 13/04* | (2006.01) |
| *B60K 13/02* | (2006.01) |

(52) U.S. Cl.
CPC ....... *F02M 35/10288* (2013.01); *B60K 13/02* (2013.01); *B60K 13/04* (2013.01); *F01N 13/082* (2013.01); *F02M 35/10013* (2013.01); *F02M 35/1015* (2013.01); *F02M 35/10131* (2013.01)

(58) Field of Classification Search
CPC .......... F02M 35/10288; F02M 35/1015; F01N 2590/08; F01N 13/082; B60K 13/02
See application file for complete search history.

(56) References Cited

U.S. PATENT DOCUMENTS

| | | | | |
|---|---|---|---|---|
| 2,763,251 | A * | 9/1956 | Dolza | F02M 35/14 123/556 |
| 3,358,787 | A * | 12/1967 | Bangasser | B60K 11/08 180/69.2 |
| 4,086,976 | A * | 5/1978 | Holm | B60K 11/04 123/41.49 |
| 4,341,277 | A * | 7/1982 | Adamson | B60K 11/08 180/68.1 |
| 6,655,486 | B2 * | 12/2003 | Oshikawa | B60K 11/08 180/68.1 |
| 2008/0053312 | A1 * | 3/2008 | Redmann | B60R 13/0838 96/380 |
| 2008/0115989 | A1 * | 5/2008 | Matte | F01N 3/021 180/68.1 |

* cited by examiner

*Primary Examiner* — Patrick D Maines
(74) *Attorney, Agent, or Firm* — Rebecca L. Henkel; Rickard K. DeMille (57) ABSTRACT

An off-road vehicle includes an air intake system that comprises an opening that, in operation, receives air, and an exhaust system that includes an exhaust stack positioned in the opening of the air intake system.

18 Claims, 7 Drawing Sheets

EXHAUST STACK IN AIR INTAKE HOUSING

BACKGROUND

The present disclosure relates generally to positioning an exhaust stack of an off-road vehicle, such as a work vehicle, in relation to an air intake of the off-road vehicle.

The off-road vehicle, such as a work vehicle, which may include an agricultural vehicle or work vehicle such as a tractor or other prime mover, may have a number of components located in an engine compartment (e.g., under a hood of the off-road vehicle). Due to the number of components, usable space in the engine compartment is limited and may restrict the size, effectiveness, and/or power of the components, addition of other components, airflow, or working space in the engine compartment.

BRIEF DESCRIPTION

In one embodiment, an off-road vehicle includes an air intake system that comprises an opening that, in operation, receives air, and an exhaust system that includes an exhaust stack positioned in the opening of the air intake system.

In another embodiment, an off-road vehicle includes an air intake system comprising an intake that, in operation, receives air via an intake flow path, and an exhaust system that includes an exhaust stack positioned in the intake flow path.

In a further embodiment, an air intake system includes a housing that includes an opening, wherein the opening, in operation, receives air, and an exhaust stack mounted on an inner surface of the housing, wherein the exhaust stack extends through the opening of the housing.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

An off-road vehicle, including an agricultural vehicle such as a tractor or other prime mover, may have a number of components located in an engine compartment (e.g., under a hood of the off-road vehicle). Moving components typically located in the engine compartment to outside the engine compartment may increase the usable space in the engine compartment and thus enable larger, more effective, and/or powerful components, additions of other components, more airflow, and/or a more convenient working space in the engine compartment. Typically, an exhaust stack of the off-road vehicle, as well as piping coupling the exhaust stack to an engine, may be located inside the engine compartment. Moving the exhaust stack and reducing the piping in the engine compartment creates more usable space in the engine compartment for larger, more effective, and/or powerful components, additions of other components, more airflow, and/or a more convenient working space. Adding the exhaust stack to a housing of an air intake system of the off-road vehicle does not add to a surface area of the off-road vehicle, advantageously reducing a footprint of the exhaust stack. The air intake system may include a baffle, rather than a typical pipe, which may increase an amount of air received via the air intake system, which may increase efficiency of the engine of the off-road vehicle.

It should be noted that the techniques disclosed may be used on any desired type of vehicle, but are particularly useful for off-road and work vehicles. More particularly, one presently contemplated application is in the area of agricultural work operations, such as on farms, in fields, in operations entailed in preparing, cultivating, harvesting and working plants and fields, and so forth. While in the present disclosure, reference may be made to the vehicle 10 as an "agricultural vehicle", it should be borne in mind that this is only one particular area of applicability of the technology, and the disclosure should not be understood as limiting it to such applications.

Figure 1:
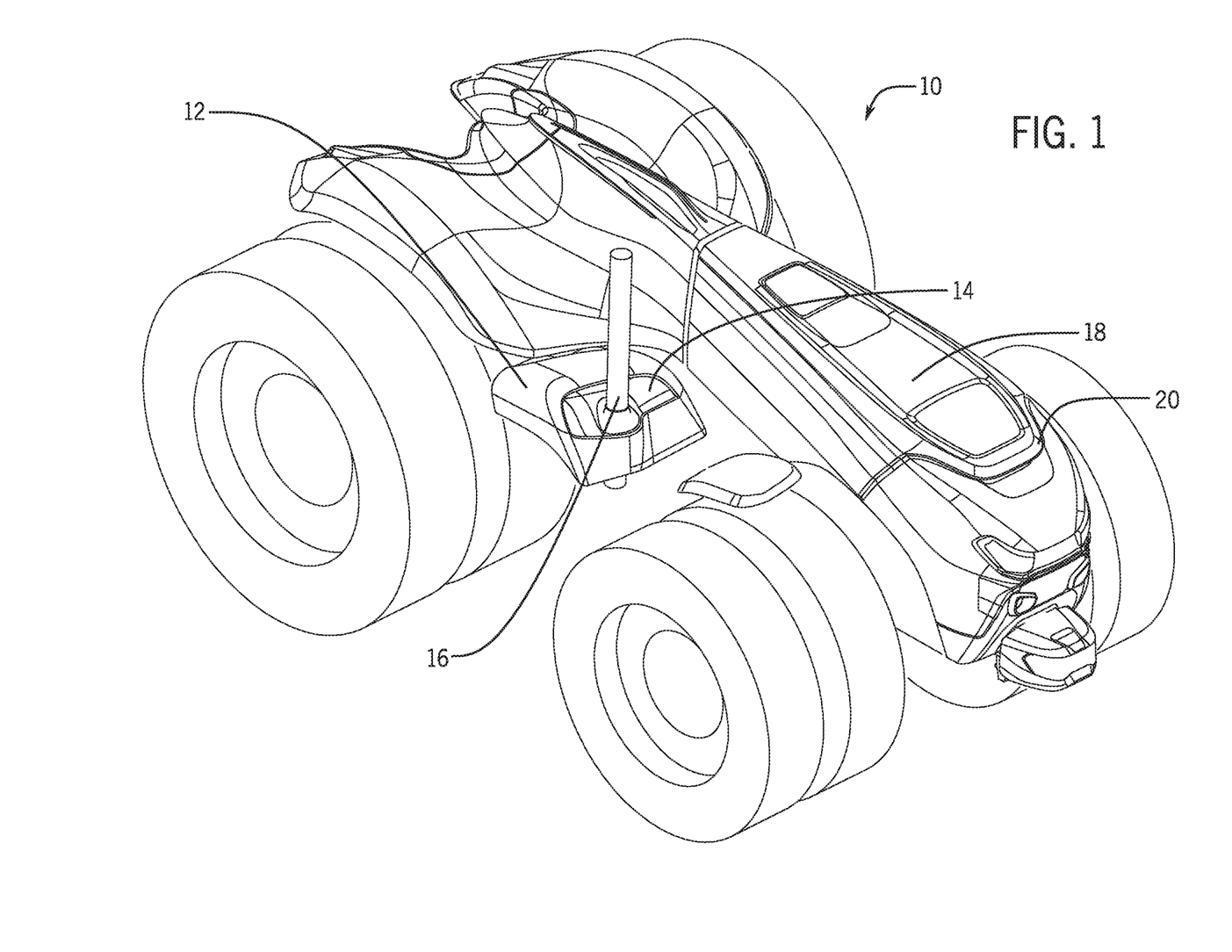
FIG. 1 is a perspective view of an autonomous vehicle that includes an exhaust stack in an air intake housing, in accordance with an embodiment of the present disclosure.

Turning now to the drawings, FIG. 1 is perspective view of an autonomous agricultural vehicle 10, in accordance with an embodiment of the present disclosure. The agricultural vehicle 10 includes an air intake system that, in operation, provides air to an engine of the agricultural vehicle 10. The air intake system may include a housing 12 that, in operation, receives air from the surrounding environment. The housing 14 may receive the air via an opening 14 of the housing 12. The agricultural vehicle 10 also includes an exhaust system that, in operation, guides exhaust gases away from the engine of the agricultural vehicle 10. The exhaust system includes an exhaust stack 16 that is located in the opening 14. Because the housing 14 of the air intake system and the exhaust stack 16 of the exhaust system are located external (e.g., laterally) to an engine compartment 18 (e.g., under a hood 20) of the agricultural vehicle 10, usable space is increased in the engine compartment 18. Additionally, positioning the exhaust stack to in the housing 14 of the air intake system does not add to surface area of the agricultural vehicle 10.

As illustrated, the agricultural vehicle 10 is autonomous, such that the agricultural vehicle 10 may be operated without an on-board operator. Thus, the agricultural vehicle 10 has no cab for the operator to occupy. Advantageously, the housing 14 and the exhaust stack 16 may be positioned without considering operator visibility.

Figure 2:
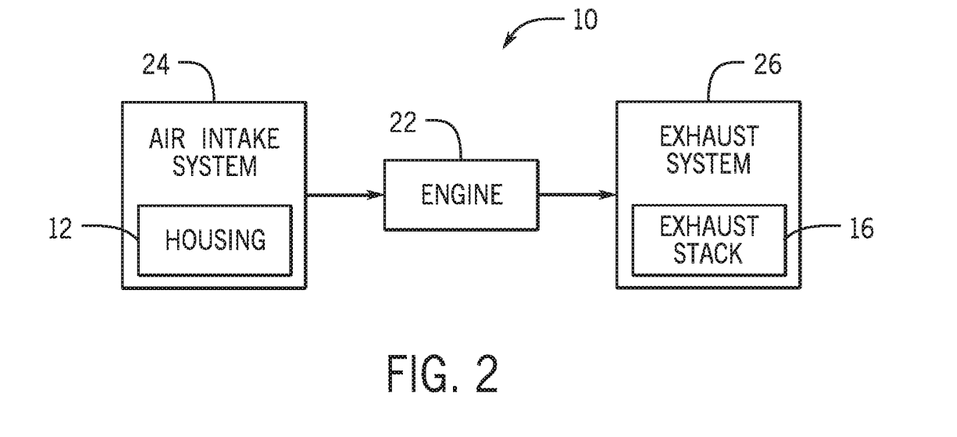
FIG. 2 is a block diagram of the autonomous vehicle, in accordance with an embodiment of the present disclosure.

FIG. 2 is a block diagram of the agricultural vehicle 10, in accordance with an embodiment of the present disclosure. The agricultural vehicle 10 includes an engine 22 that, in operation, propels or drives the agricultural vehicle 10. The air intake system 24, in operation, provides air from the surrounding environment to the engine 22, via the opening 14 of the housing 12. The engine 22 combines the air to fuel in order to propel or drive the agricultural vehicle 10. The engine 22 discharges exhaust gases, which are guided by the exhaust system 26 and expelled to the surrounding environment via the exhaust stack 16.

Figure 3:
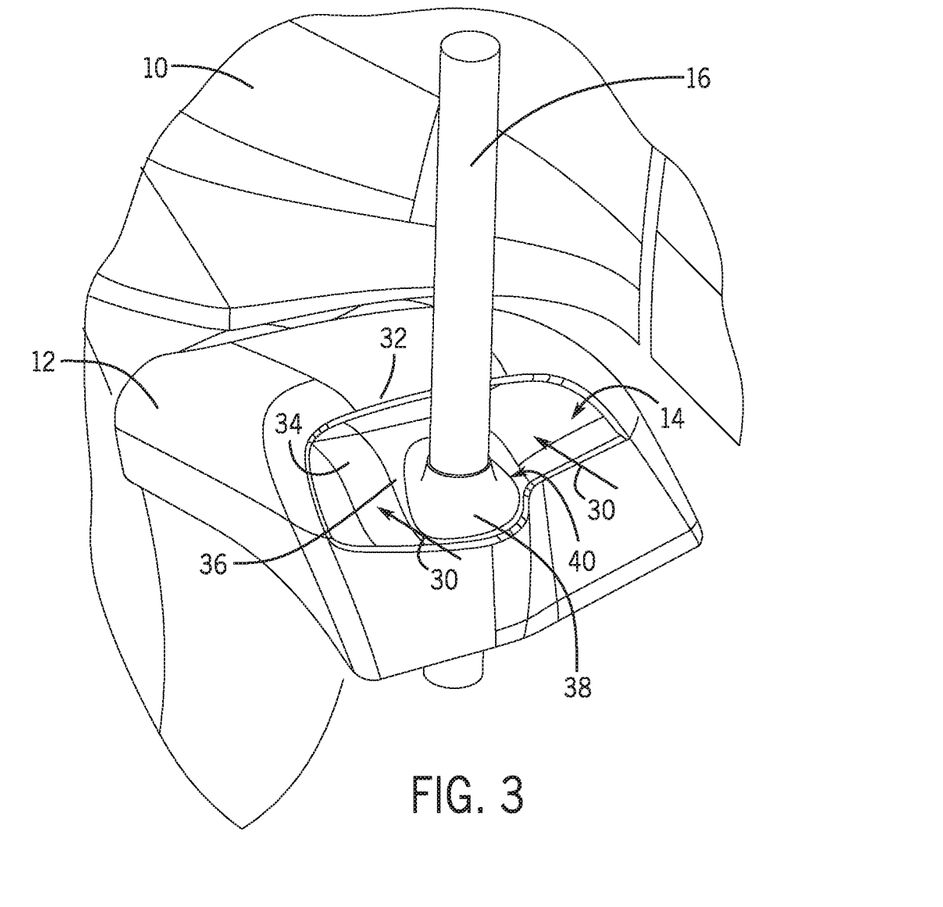
FIG. 3 is a perspective view of an air intake housing and an exhaust stack of FIG. 1, in accordance with an embodiment of the present disclosure.

FIG. 3 is a perspective view of the air intake housing 12 and the exhaust stack 16 of FIG. 1, in accordance with an embodiment of the present disclosure. The air intake housing 12 receives air via an intake flow path 30 when in operation. As illustrated, the exhaust stack 16 is positioned in the intake flow path 30. The opening 14 of the housing 12 may be size such that the exhaust stack 16 provides negligible interference to the intake flow path 30. As illustrated, the housing 12 includes a baffle 32 that has the opening 14. The surface area of the opening 14 of the baffle 32 may be larger than that of air intake systems using a pipe, which may increase an amount of air received via the air intake system 24. Increasing the amount of air received via the air intake system 24, and thus to the engine 22, may increase effectiveness and/or efficiency of the engine 22.

As illustrated, the exhaust stack 16 is mounted on an inner surface 34 of the housing 12, and extends through the opening 14 of the housing 12. The shape of the inner surface 34 is sloped 36, and the exhaust stack 16 may be mounted at least partially on the slope 36. In some embodiments, a fairing 38 is coupled to the exhaust stack 16 at a location 40 where the exhaust stack 16 is mounted to the inner surface 34. The fairing 38 may be configured to protect the coupling of the exhaust stack 16 to the housing 12 (e.g., from environmental damage, fouling, debris, and the like).

Figure 4:
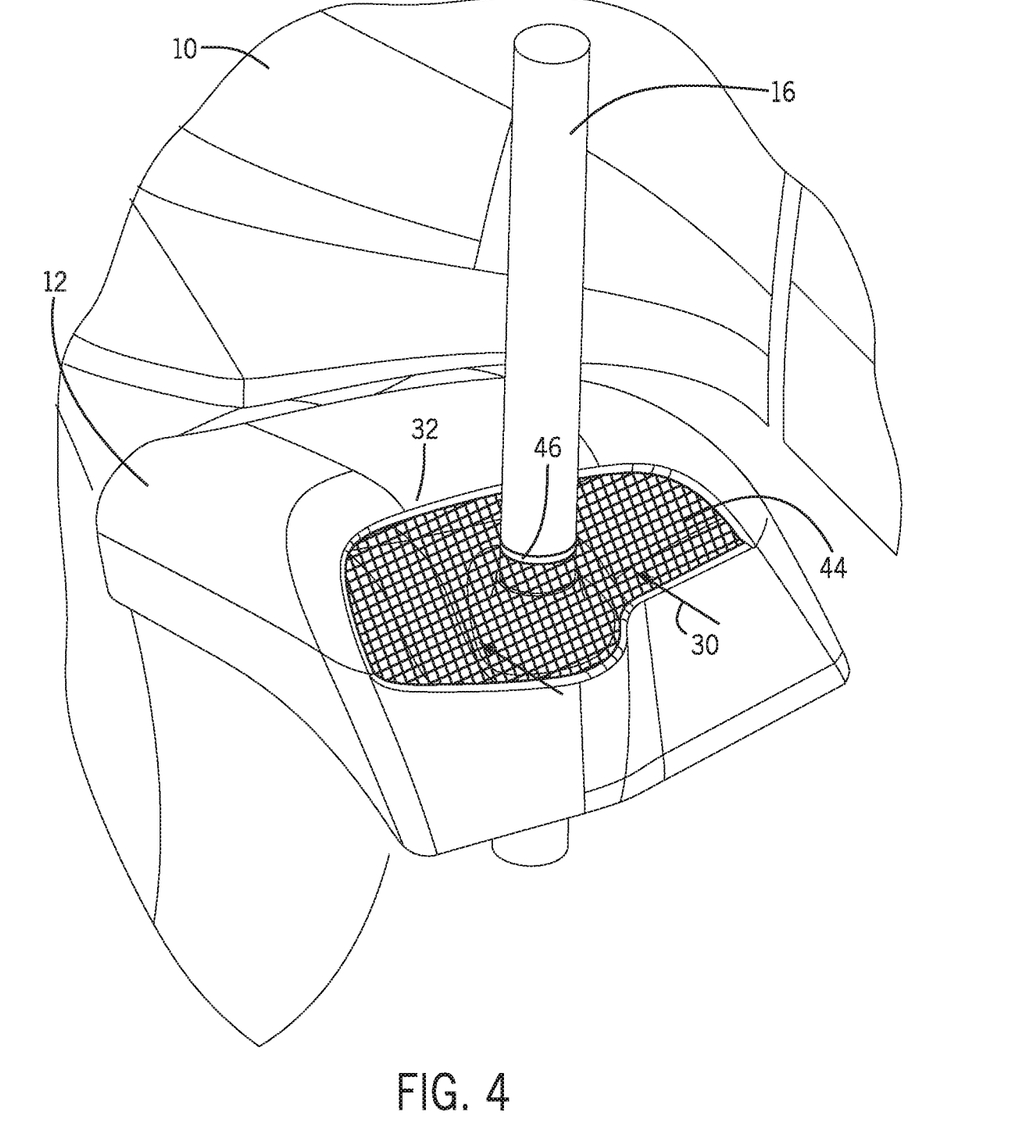
FIG. 4 is a perspective view of the air intake housing and the exhaust stack of FIG. 3 including a screen mounted at an opening of the housing, in accordance with an embodiment of the present disclosure.

FIG. 4 is a perspective view of the air intake housing 12 and the exhaust stack 16 of FIG. 3 including a screen 44 mounted at the opening 14 of the housing 12, in accordance with an embodiment of the present disclosure. As illustrated the screen 44 is positioned in the intake flow path 30. The screen 44, in operation, filters debris, chaff, and other unwanted matter from the air entering the opening 14 of the housing 12 to limit fouling and/or damage to the engine 22 of the agricultural vehicle 10. In some embodiments, the screen 44 includes an aperture 46 that enables the exhaust stack 16 to extend through the aperture 46.

Figure 5:
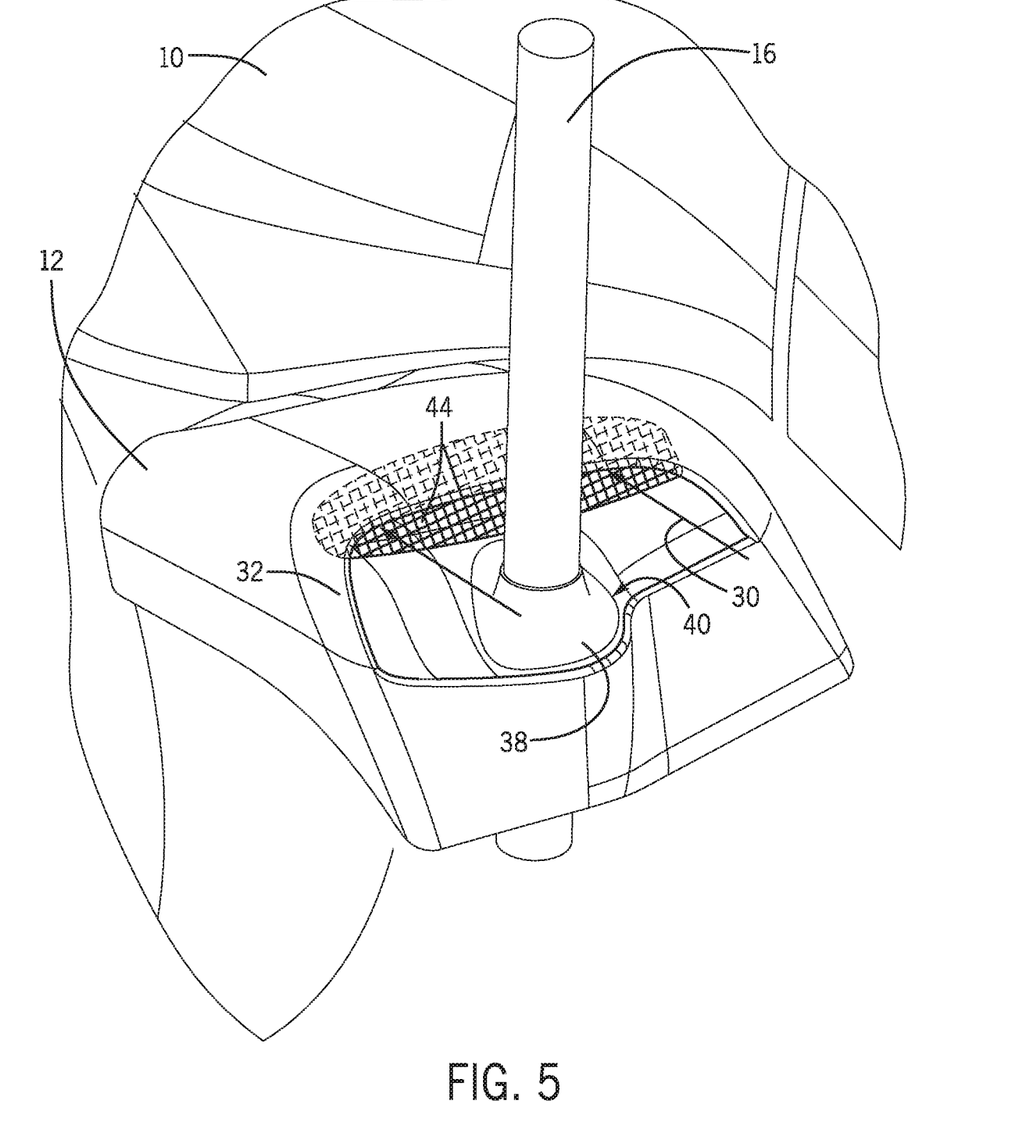
FIG. 5 is a perspective view of the air intake housing and the exhaust stack of FIG. 3 including a screen mounted within the housing, in accordance with an embodiment of the present disclosure.

FIG. 5 is a perspective view of the air intake housing 12 and the exhaust stack 16 of FIG. 3 including a screen 44 mounted within the housing 12, in accordance with an embodiment of the present disclosure. As illustrated the screen 44 is positioned in the intake flow path 30. The screen 44, in operation, filters debris, chaff, and other unwanted matter from the air entering the opening 14 of the housing 12 to limit fouling and/or damage to the engine 22 of the agricultural vehicle 10. The screen 44 is mounted on the inner surface 34 of the housing 12. In some embodiments, the screen 44 is mounted behind the exhaust stack 16 relative to the direction of forward travel of the agricultural vehicle 10. In some embodiments, the screen 44 may be mounted over or across an opening to an air intake shaft directing air to the engine 22. As such, the screen 44 may not be visible from the exterior of the agricultural vehicle 10.

Figure 6:
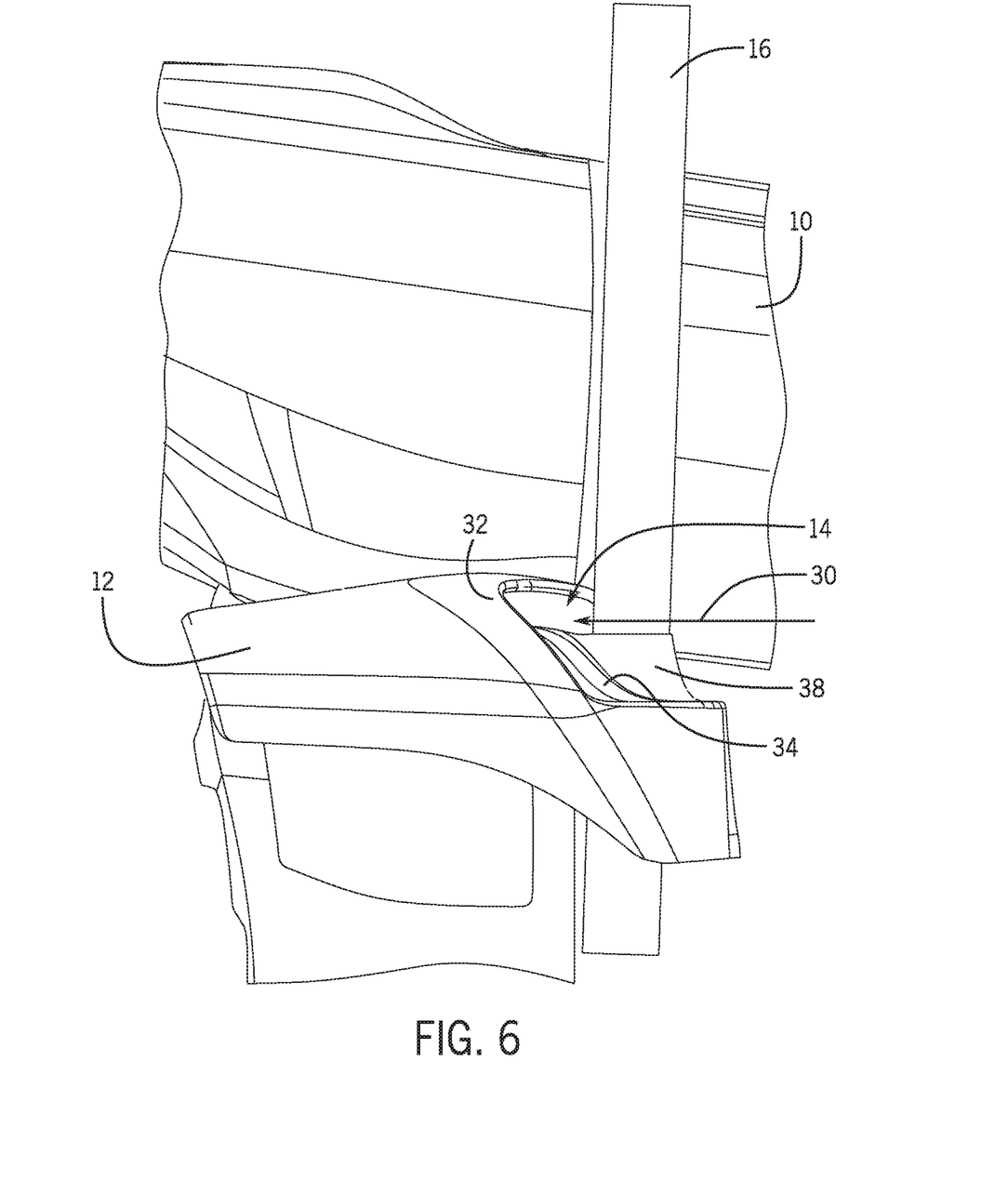
FIG. 6 is a side view of the air intake housing and the exhaust stack of FIG. 3, in accordance with an embodiment of the present disclosure.

FIG. 6 is a side view of the air intake housing 12 and the exhaust stack 16 of FIG. 3, in accordance with an embodiment of the present disclosure.

Figure 7:
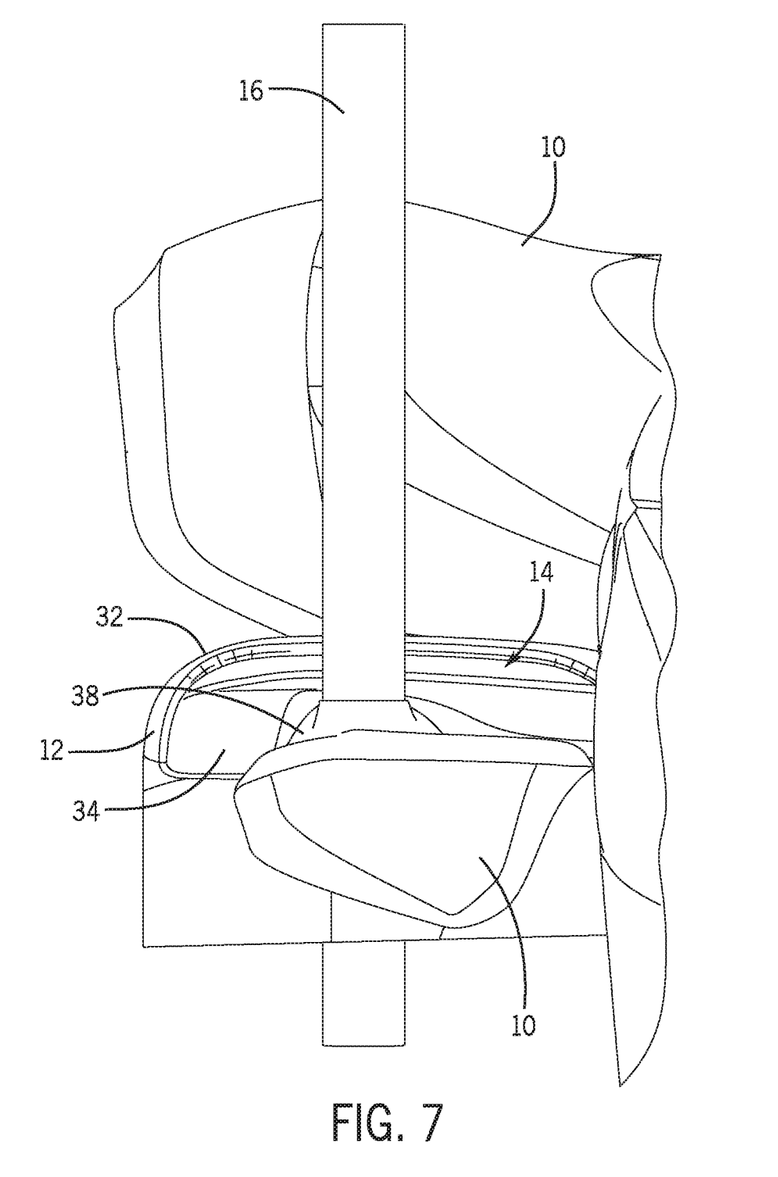
FIG. 7 is a front view of the air intake housing and the exhaust stack of FIG. 3, in accordance with an embodiment of the present disclosure.

FIG. 7 is a front view of the air intake housing 12 and the exhaust stack 16 of FIG. 3, in accordance with an embodiment of the present disclosure.

Figure 8:
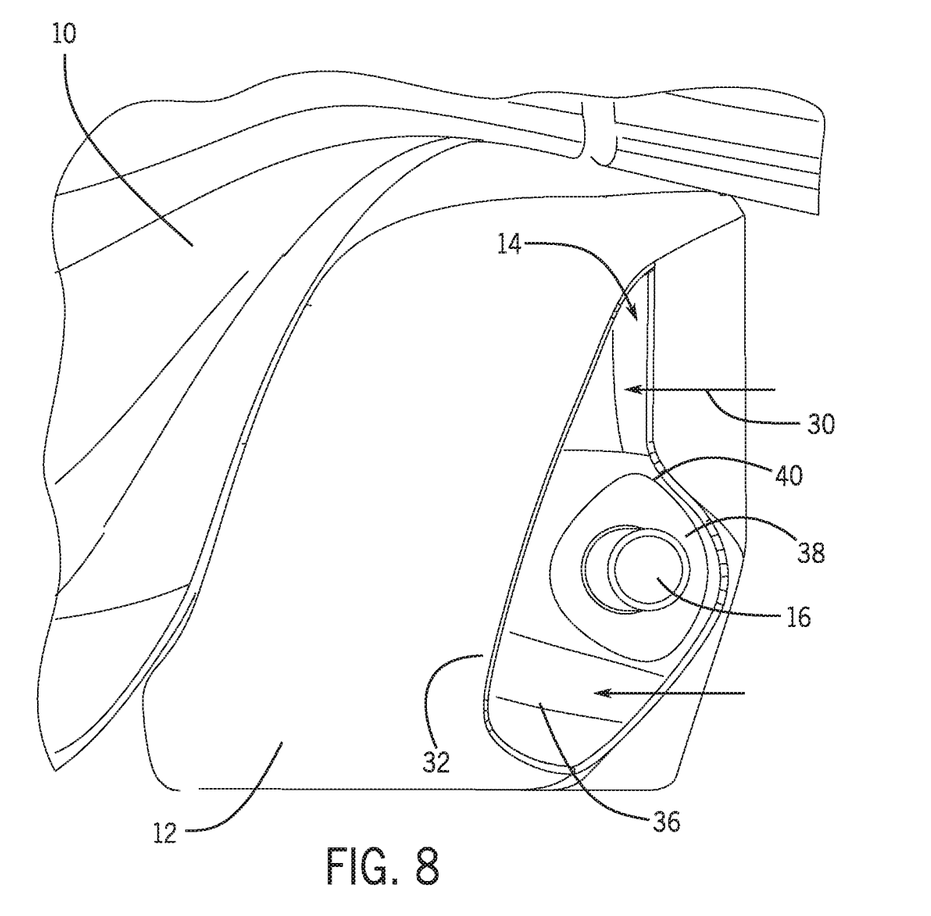
FIG. 8 is a top view of the air intake housing and the exhaust stack of FIG. 3, in accordance with an embodiment of the present disclosure.

FIG. 8 is a top view of the air intake housing 12 and the exhaust stack 16 of FIG. 3, in accordance with an embodiment of the present disclosure.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An off-road vehicle comprising:
an air intake system comprising a housing having an opening that, in operation, receives air, wherein the housing is located outside an engine compartment of the off-road vehicle;
an exhaust system mounted on an inner surface of the housing of the air intake system, wherein the exhaust system comprises an exhaust stack that is positioned in the opening of the air intake system and transects a plane of the opening of the air intake system.

2. The off-road vehicle of claim 1, wherein at least a portion of the inner surface of the housing is sloped, wherein the exhaust stack is mounted at least partially on the portion.

3. The off-road vehicle of claim 1, wherein a fairing is coupled to the exhaust stack at a location where the exhaust stack is mounted on the inner surface of the housing.

4. The off-road vehicle of claim 1, wherein the exhaust stack is located outside an engine compartment of the off-road vehicle.

5. The off-road vehicle of claim 1, wherein the off-road vehicle is autonomous.

6. An off-road vehicle comprising:
an air intake system comprising:
an intake that, in operation, receives air via an intake flow path; and
a housing comprising an opening that receives the air via the intake flow path, wherein the housing is located outside an engine compartment of the off-road vehicle;
an exhaust system comprising an exhaust stack positioned in the opening of the housing, wherein the exhaust stack transects a plane of the opening of the housing.

7. The off-road vehicle of claim 6, wherein the exhaust stack is mounted on an inner surface of the housing of the air intake system.

8. The off-road vehicle of claim 7, wherein a fairing is coupled to the exhaust stack at a location where the exhaust stack is mounted on the inner surface of the housing.

9. The off-road vehicle of claim 6, wherein the air intake system comprises a baffle to receive the air via the intake flow path.

10. The off-road vehicle of claim 9, wherein the baffle is located laterally to an engine compartment of the off-road vehicle.

11. The off-road vehicle of claim 6, wherein the air intake system comprises a screen positioned in the intake flow path.

12. The off-road vehicle of claim 11, wherein the screen is positioned along the plane of the opening of the housing.

13. An air intake system comprising:
a housing comprising an opening, wherein the opening, in operation, receives air, wherein the housing is located outside an engine compartment of an off-road vehicle;
an exhaust stack mounted on an inner surface of the housing, wherein the exhaust stack extends through the opening of the housing and transects a plane of the opening of the housing.

14. The air intake system of claim 13, wherein the air intake system comprises a screen mounted along the plane of the opening of the housing.

15. The air intake system of claim 14, wherein the screen comprises an aperture that, in operation, enables the exhaust stack to extend through the aperture.

16. The air intake system of claim 13, wherein the air intake system comprises a screen mounted within the housing.

17. The air intake system of claim 14, wherein the screen is mounted on the inner surface of the housing.

18. The air intake system of claim 13, wherein the air intake system comprises a fairing coupled to the exhaust stack at a location where the exhaust stack is mounted on the inner surface of the housing.

\* \* \* \* \*